United States Patent [19]

Tarrer

[11] 4,226,255
[45] Oct. 7, 1980

[54] GRILL AND RACK CLEANING CONTAINER

[76] Inventor: Harold M. Tarrer, P.O. Box 156, Lula, Ga. 30554

[21] Appl. No.: 33,204

[22] Filed: Apr. 25, 1979

[51] Int. Cl.³ ............................................. B08B 3/04
[52] U.S. Cl. .................................. 134/117; 134/137; 126/9 R; 126/25 R; 150/0.5; 220/23.86; 312/229
[58] Field of Search .................... 126/9 R, 9 B, 25 R; 134/84–85, 92, 115 R, 117–121, 135, 137, 150, 154, 166 R, 183, 201; 248/214; 150/0.5; 220/23.83, 23.86; 312/229, 284

[56] References Cited

U.S. PATENT DOCUMENTS

| | | | |
|---|---|---|---|
| 486,756 | 11/1892 | Bradshaw | 134/92 X |
| 912,951 | 2/1909 | Gore | 312/284 |
| 1,890,374 | 12/1932 | Freund | 134/120 X |
| 2,646,808 | 7/1953 | Yenne | 134/115 R X |
| 2,999,494 | 9/1961 | Richardson | 126/9 R X |
| 3,915,532 | 10/1975 | Ashton | 150/0.5 X |

FOREIGN PATENT DOCUMENTS 264963  1/1966  Australia .................................. 134/118

Primary Examiner—Robert L. Bleutge
Attorney, Agent, or Firm—Clarence A. O'Brien; Harvey B. Jacobson

[57] ABSTRACT

An imperforate container having an open top and including a cover is provided with an attachment mechanism for hanging on or in the vicinity of an outdoor barbecue. The container is adapted to contain a cleaning solution and will receive the removable grill or rack of the barbecue for soaking it clean between periods of use.

3 Claims, 5 Drawing Figures

U.S. Patent
Oct. 7, 1980
4,226,255
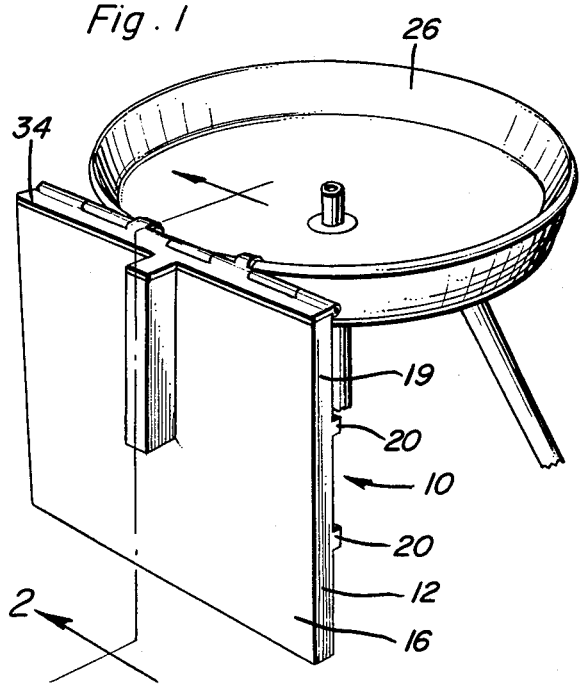
Fig. 1
Fig. 2
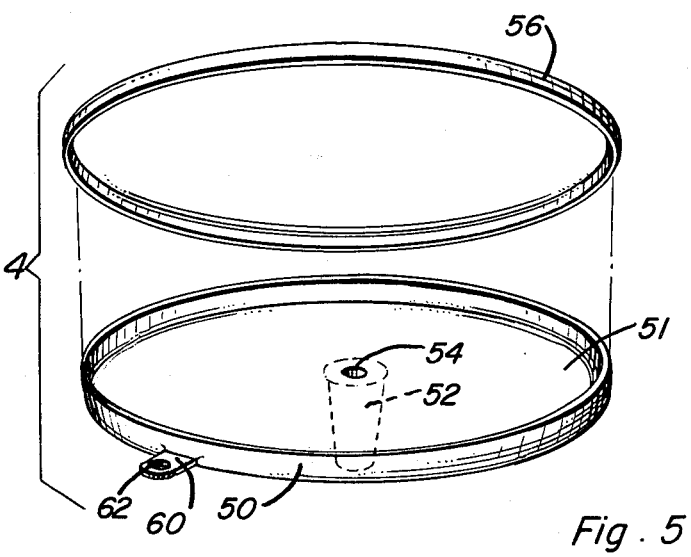
Fig. 4
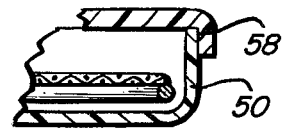
Fig. 5
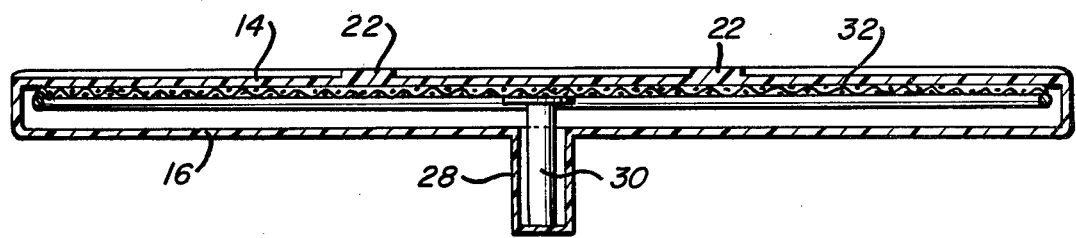
Fig. 3

GRILL AND RACK CLEANING CONTAINER

BACKGROUND OF THE INVENTION

1 Field of the Invention

This invention relates to containers adapted to receive a cleaning solution and articles to be cleaned by soaking in the solution during periods when the articles are not being used.

2 Description of Related Art

As is well known to persons who regularly cook on an outdoor barbecue, one of the greatest deterrents to the use of such a barbecue is produced by the effort necessary for insuring that the grill or rack of the device is sufficiently clean and free of debris to insure a sanitary cooking environment. When the rack or grill of the barbecue is subjected to direct heat from burning charcoal or wood, together with the grease from various meats, the metallic surface becomes charred and coated with thick layers of grime which are difficult if not impossible to remove. If the grill or rack is to be maintained in a spotless condition, it is necessary to remove it after every use and scrub it clean. Due to this undesirable chore, a need has arisen for some device which will facilitate the cleaning of racks or grills of outdoor barbecues in order to enhance the pleasure associated with cooking out of doors.

It is generally known to provide containers having cleaning fluid disposed therein for soaking an article clean. For example, U.S. Pat. No. 3,894,551, issued July 15, 1975 to Stohlman, discloses a container for use of cleaning jewelry. Inserted in the container is a basket adapted to contain the jewelry to be cleaned. The basket has side walls and a perforated bottom and is adapted to be lowered in or held over cleaning fluid disposed within the container.

SUMMARY OF THE INVENTION

One embodiment of the present invention comprises a container which is hung from the edge of an outdoor barbecue. The container is generally square in elevation and rectangular in plan with the thickness of the container being only slightly greater than the depth of the average grill or rack. A rectangular projection extends from the side of the container for receiving the central shaft of a circular rack. A hinged top is included for providing a substantially airtight interior in order to guard against evaporation of the cleaning fluid. A second embodiment of the the invention includes a substanially circular base portion having a depending enclosure for surrounding the shaft of the rack. A circular top is provided to press fit over the base.

Accordingly, one object of the present invention is to provide a novel grill and rack cleaning container which can hold a supply of cleaning fluid for soaking the grill or rack.

A further object of the present invention is to provide a novel grill and rack cleaning container which can be easily disposed in the vicinity of an outdoor barbecue in order to facilitate the cleaning of the grill or rack of the barbecue.

An even still further object of the present invention is to provide a grill and rack containing container which is simple in construction yet rugged and durable in use.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the grill and rack cleaning container as hung from the rim of a barbecue.

FIG. 2 is an elevational sectional view taken substantially along a plane passing through section line 2—2 of FIG. 1.

FIG. 3 is a plan sectional view taken substantially along a plane passing through section line 3—3 of FIG. 2.

FIG. 4 is an exploded perspective view of a second embodiment of the grill and rack cleaning container.

FIG. 5 is an enlarged fragmental sectional view showing the top and the base connection of the embodiment of FIG. 4.

DESCRIPTION OF THE PREFERRED EMBODIMENT

Now with reference to the drawings, a grill and rack cleaning enclosure embodying the principles of the present invention and generally referred to by the reference numeral 10 will be described in detail. With specific reference to FIGS. 1-3, the grill and rack cleaning container can be seen to include a substantially unitary base 12 which is made from acid resistant material such as polyvinyl chloride or the like. The base 12 has a substantially square rear wall 14 and a substantially square front wall 16 which are interconnected by a substantially rectangular bottom 18 and a pair of side walls 19. The rear wall 14 has a plurality of horizontal reinforcing strips 20 molded therein for providing structural rigidity to the container. A plurality of vertical reinforcing strips 22 are also included in the rear wall 14 and terminate in hooks 24. Hooks 24 may be used to hang the container from the lip of a standard outdoor barbecue such as shown at 26. Alternatively, the container can be suspended from any convenient structure. Front wall 16 is substantially planar in form except for hollow lateral projection 28 which extends therefrom. Projection 28 has an open top and is adapted to receive the shaft 30 of the removable barbecue grill 32 when the body of the grill is disposed in the base 12. A top 34 is hingedly connected to the rear wall 14 and provides a reasonably airtight seal for the interior to inhibit the evaporation of the cleaning fluid which is disposed therein.

In operation, the grill and rack cleaning container is hung in the vicinity of the barbecue and the cleaning fluid is maintained therein. After the cooking process is completed, the grill 32 is removed from the barbecue and top 34 is swung upwardly exposing the interior of the container. The grill 32 is dropped into the container with shaft 30 disposed in extension 28. The cover is swung downwardly enclosing the container interior and the rack is allowed to soak in the cleaning fluid until it is needed again. When it is desired to use the rack, it is simply removed from the container and rinsed with a garden hose, the cleaning solution having dissolved grease and loosened any grime which adhered to the rack during the cooking process. The same cleaning solution can be used indefinitely or replaced at will by simply removing the container and dumping the solution with any accumulated debris which may have gravitated to the bottom of the container.

FIGS. 4 and 5 show a second embodiment of the grill and rack cleaning container wherein a cylindrical base 50 has a bottom 51 which contains a depending extension shown at 52 having an aperture 54 therein for receiving shaft 30 of grill 32. A cover 56 has a generally circular body and a depending flange 58 attached thereto for making a press fit over the cylindrical base portion 50, thereby producing a substantially airtight seal to inhibit the evaporation of cleaning solution disposed in the base. A laterally extending flange 60 extends radially from the base portion 50 and has a small aperture 62 formed therein for hanging the container from a hook or nail in a convenient location.

As can be seen and understood from the foregoing, the grill and rack cleaning container can be easily disposed in the vicinity of the outdoor barbecue and filled with a cleaning fluid such as any standardly available detergent or ammoniated detergent. In order to facilitate the cleaning process, the device can be positioned in the direct rays of the sun for heating the cleaning fluid and producing enhanced cleaning action. Furthermore, the device may be colored with a dark or black pigment to further enhance the heating effect from the sun's rays and still further increase the cleaning effect of the solution.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A container for storing and cleaning the grill of an outdoor barbecue device, comprising:
   an imperforate base having an open top, a pair of parallel generally square side walls, a bottom extending between and connecting said side walls, and a pair of parallel end walls extending between and interconnecting said side walls;
   a generally rectangular projection formed in one of said side walls, said projection projecting laterally from said one of said side walls and having a length approximately equal to one-half of the height of said one of said side walls, said projection being formed as a part of said base and having an open top constituting part of the open top of said base;
   a cover hingedly connected to said base for closing off said open top including the top of said projection, said cover being generally rectangular in shape with a rectangular extension attached transversely thereto, said extension being disposed over the top portion of said rectangular projection;
   means connected to said base for hanging said container in a convenient location, said means comprising a plurality of hooks being formed with said base and extending rearwardly from said base; and
   a cleaning solution disposed in said imperforate base for cleaning a barbecue grill immersed therein.

2. The invention as defined in claim 1 and further including reinforcing strips formed integrally with the other of said side walls, a plurality of reinforcing strips extending horizontally along said side wall and a plurality of reinforcing strips extending vertically along said side wall with said hooks being formed integrally with ones of said vertical reinforcing strips.

3. A container for storing and cleaning the grill of a barbecue device, comprising:
   an imperforate base having a generally cylindrical shape with a circular bottom and upstanding annular side wall attached to said bottom;
   a projection formed in the center of said circular bottom extending axially downwardly from the center of said base and having an aperture formed therein for receiving the shaft of the barbecue grill;
   a top having a generally cylindrical shape and including a circular upper portion and a depending annular flange, said top being slightly larger than said base for press fitting onto said base and enclosing the interior of said base;
   a cleaning solution disposed in said base for cleaning a barbecue grill immersed therein; and
   means connected to said container for hanging said container in a convenient location.

* * * * *